US009194375B2

(12) United States Patent
Pedersen

(10) Patent No.: US 9,194,375 B2
(45) Date of Patent: Nov. 24, 2015

(54) METHOD FOR INSTALLING A WIND TURBINE, A NACELLE FOR A WIND TURBINE, AND METHOD FOR TRANSPORTING ELEMENTS OF A WIND TURBINE

(75) Inventor: Gunnar Kamp Storgaard Pedersen, Skjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 1079 days.

(21) Appl. No.: 13/132,025

(22) PCT Filed: Dec. 2, 2009

(86) PCT No.: PCT/DK2009/050318
§ 371 (c)(1),
(2), (4) Date: Jun. 23, 2011

(87) PCT Pub. No.: WO2010/063291
PCT Pub. Date: Jun. 10, 2010

(65) Prior Publication Data
US 2011/0250077 A1    Oct. 13, 2011

Related U.S. Application Data

(60) Provisional application No. 61/200,782, filed on Dec. 2, 2008.

(30) Foreign Application Priority Data

Dec. 2, 2008    (DK) .................................. 2008 01695

(51) Int. Cl.
*F03D 11/00*    (2006.01)
*F03D 1/00*    (2006.01)
(52) U.S. Cl.
CPC ............ *F03D 11/0008* (2013.01); *F03D 1/001* (2013.01); *F05B 2230/61* (2013.01); *F05B2230/70* (2013.01); *F05B 2240/14* (2013.01); *F05B 2260/301* (2013.01); *Y02E 10/722* (2013.01); *Y02E 10/726* (2013.01); *Y02E 10/728* (2013.01); *Y10T 29/49316* (2015.01); *Y10T 29/49318* (2015.01)
(Continued)

(58) Field of Classification Search
CPC .... Y02E 10/722; Y02E 10/726; Y02E 10/728
USPC .............. 416/244 R; 29/426.1, 889.2; 290/55
See application file for complete search history.

(56) References Cited

U.S. PATENT DOCUMENTS 6,833,632 B2 * 12/2004 Becker et al. ................... 290/55
7,736,125 B2 * 6/2010 Bagepalli et al. ............. 415/126
(Continued)

FOREIGN PATENT DOCUMENTS

| EP | 1 291 521 | 3/2003 |
|---|---|---|
| EP | 1 772 624 | 4/2007 |

(Continued)

OTHER PUBLICATIONS

Pierluigi Pileri; International Preliminary Report on Patentability issued in priority International Application No. PCT/DK2009/050318; Jun. 24, 2011; 10 pages; European Patent Office.
(Continued)

*Primary Examiner* — Igor Kershteyn
*Assistant Examiner* — Woody A Lee, Jr.
(74) *Attorney, Agent, or Firm* — Wood, Herron & Evans, LLP

(57) ABSTRACT

Disclosed is a method for mounting elements when installing a wind turbine by hoisting the hub to the nacelle. The hub includes the main bearing mounted to the hub with fastening members such as bolts. Also disclosed is a nacelle for a wind turbine, said nacelle provided with a slot for accommodating a main bearing for the hub. Also disclosed is a method for transporting elements of a wind turbine, said elements comprising a nacelle, a hub and a main bearing for the hub, and said method comprising assembling the hub and the main bearing with fastening members at the site of production or at another preliminary site.

4 Claims, 7 Drawing Sheets

(56) References Cited

U.S. PATENT DOCUMENTS

| | | | |
|---|---|---|---|
| 7,944,077 B2* | 5/2011 | Fischer et al. | 290/55 |
| 8,120,198 B2* | 2/2012 | Pabst et al. | 290/55 |

FOREIGN PATENT DOCUMENTS

| | | |
|---|---|---|
| EP | 1 925 820 | 5/2008 |
| EP | 2 148 090 | 1/2010 |
| WO | 2005/007515 | 1/2005 |
| WO | 2005/028862 | 3/2005 |
| WO | 2009/080712 | 7/2009 |

OTHER PUBLICATIONS

Pierluigi Pileri; International Search Report and Written Opinion issued in priority International Application No. PCT/DK2009/050318; Jan. 19, 2011; 16 pages; European Patent Office.

Age Larsen; Search Report issued in related Denmark Application No. PA 2008 01693; Jul. 17, 2009; 5 pages; Denmark Patent and Trademark Office.

* cited by examiner

METHOD FOR INSTALLING A WIND TURBINE, A NACELLE FOR A WIND TURBINE, AND METHOD FOR TRANSPORTING ELEMENTS OF A WIND TURBINE

FIELD OF THE INVENTION

The present invention relates to a method for dismounting a main bearing and a hub of a wind turbine. The invention also relates to a method for transporting elements of a wind turbine, said elements comprising a nacelle, a hub and a main bearing for the hub. The invention also relates to a method for mounting wind turbine elements when installing a wind turbine. The invention furthermore relates to a nacelle for a wind turbine.

BACKGROUND OF THE INVENTION

Mounting and dismounting of elements of a wind turbine at the site of installation of the wind turbine is time-consuming and involves different machinery and other equipment. Depending on the site of installation, e.g. at a remote land site or at sea, the costs of installing a wind turbine may be a more or less significant amount of the total costs for manufacturing, transporting and installing the wind turbine. Also, if an element of the wind turbine is to be dismounted, e.g. from the nacelle, either for being substituted or for being repaired on ground or at a site remote from the site of installation, machinery and other equipment must be provided for the dismounting. Therefore, also during dismounting of elements of the wind turbine, the costs of dismounting may be a more or less significant amount of the total costs for replacing or repairing the element in question.

Hence, an improved method of dismounting elements would be advantageous.

OBJECT OF THE INVENTION

It is a further object of the present invention to provide an alternative to the prior art. In particular, it may be seen as an object of the present invention to provide a method that solves the above mentioned problems of the prior art with regard to costs and capability of dismounting and mounting elements of the wind turbine. It may also be seen as an object of the invention to provide a method easing transportation of elements of the wind turbine or to provide elements of the wind turbine easing installation.

SUMMARY OF THE INVENTION

Thus, the above described object and several other objects are intended to be obtained in a first aspect of the invention by a method for dismounting a main bearing, said main bearing constituting a wind turbine element of an already installed wind turbine, said elements comprising a nacelle, a hub and a main bearing for the hub, and said method comprising a set of locking members being forced through holes in a mounting flange of the hub, and the set of locking members further being forced into recesses in an element of the nacelle, said element preferably being at least one of the following elements, with the proviso that the element is present in the nacelle: an input shaft of a gear box, a chassis of the gear box, a gear wheel of the gear box, a gear wheel suspension of the gear box, a main frame of the nacelle or a mounting flange of a main shaft, thereby locking and retaining the hub to the nacelle.

the main bearing being dismounted from the element in question of the nacelle, by a first set of fastening members being released from recesses in the element in question of the nacelle, and the first set of fastening members further being released through recesses in a bearing ring of the main bearing, and the main bearing further being dismounted from the hub by a second set of fastening members being released from a main frame of the nacelle, and the second set of fastening members further being released through recesses in another bearing ring of the main bearing, said main bearing being displaced from the nacelle through a slot in the nacelle, said slot having accommodated the main bearing for the hub, and said slot configuring a cavity with an orifice in the nacelle, said orifice being provided in a plane of the main bearing when the main bearing is in operating position in the nacelle, and said orifice having a width, when viewed in a plane perpendicular to a substantially horizontal axis, said width of the orifice being larger than a transverse dimension of the main bearing when viewed in the plane perpendicular to a substantially horizontal axis.

Dismounting the main bearing through an orifice of a slot, and with a width of the slot allowing passage of the main bearing, results in an easy, a fast, a safe and a cost-effective way of dismounting a main bearing for possible maintenance, repair or replacement. There is no need for the main bearing to pass inside the nacelle, i.e. the main bearing is passed directly from the slot through the orifice.

Securing the hub to the nacelle during dismounting the main bearing results in an even easier, even faster, even safer and even more cost-effective way of dismounting and a main bearing. The hub is maintained in place, i.e. the hub need not be dismounted because of dismounting the main bearing.

The set of locking members may be any suitable member, preferably just pins, perhaps with locking elements, alternatively bolts and possibly nuts.

According to a preferred aspect of the invention when dismounting the main bearing, the method comprises the initial and preliminary step of displacing the hub along a rotational axis of the wind turbine, thereby increasing a distance between the hub and at least one element of the nacelle, said at least one element of the nacelle, with the proviso that the element is present in the nacelle, being: an input shaft of a gear box, a chassis of the gear box, a gear wheel of the gear box, a gear wheel suspension of the gear box, a main frame of the nacelle or a mounting flange of a main shaft, said displacement of the hub in relation to the at least one element being performed preliminary to the locking and retaining of the hub to the nacelle.

Displacing the hub in relation to the element in question of the nacelle releases possible abutment which the hub may have to the main bearing. Thereby, the main bearing is released from a possible squeeze-in between the hub and the element in question of the nacelle. The main bearing may thereby more easily be dismounted form the slot of the nacelle, and in which the main bearing is situated.

According to a second aspect possible of implementing based on the aspects of the invention, a method for dismounting a hub is provided, said hub constituting a wind turbine element of an already installed wind turbine, said elements comprising a nacelle, a hub and a main bearing for the hub, and said method comprising the hub being dismounted from the main bearing of the wind turbine by a first set of fastening members being released from recesses in at least one element of the nacelle, said element, said at least one element of the nacelle, with the proviso that the element is present in the nacelle, being: an input shaft of a gear box, a chassis of the gear box, a gear wheel of the gear box, a gear wheel suspension of the gear box, a main frame of the nacelle or a mounting flange of a main shaft, and the first set of fastening members further being released from recesses in the inner bearing ring or in outer bearing ring of the main bearing, and the main bearing being maintained to the element in question of the nacelle by a second set of fastening members being maintained in an advanced position in the element in question of the nacelle, and said hub being displaced from the nacelle with the main bearing in position in the nacelle during displacement of the hub from the main bearing.

Dismounting the hub while maintaining the main bearing in place results in an easy, a fast, a safe and a cost-effective way of dismounting a hub for possible maintenance, repair or replacement. The main bearing is maintained in place, i.e. the main bearing need not be dismounted because of dismounting the hub.

A nacelle, suitable for performing the method according to the first aspect of the invention, has a slot in the main frame of the nacelle, said slot intended for accommodating the main bearing for the hub, and said slot configuring a cavity in the main frame of the nacelle with an orifice and an inner extension, said orifice being provided in a plane of the main bearing when the main bearing is in operating position in the nacelle, and said orifice having a width, when viewed in a plane perpendicular to a substantially horizontal axis, said width of the orifice being larger than a transverse dimension of the main bearing, when the main bearing is in position and viewed in a plane perpendicular to a substantially horizontal axis.

Providing the nacelle with a slot is particularly, but not exclusively, advantageous when the hub with the main bearing is to be mounted to the at least one element of the nacelle such as an input shaft of a gear box, a chassis of the gear box, a gear wheel of the gear box, a gear wheel suspension of the gear box, a main frame of the nacelle or a mounting flange of a main shaft. Providing the nacelle with a slot is also particularly, but not exclusively, advantageous when the hub or the main bearing is to be dismounted from the element in question of the nacelle.

The slot being provided with an orifice, and said orifice lying in a plane of the main bearing when the main bearing is in operating position in the nacelle, results in the main bearing, although already being mounted to the hub, may be mounted to the mounting flange of the main shaft or the nacelle element in question when the hub is hoisted to the nacelle on top of a wind turbine tower. The width of the orifice is larger than a transverse dimension such as an outer diameter of the main bearing so that the main bearing may be easily passed through the orifice into the slot.

According to a different possible embodiment of the nacelle, said orifice of the slot has an orientation, when viewed perpendicular to the width and when viewed in the plane perpendicular to a substantially horizontal axis, directed in at least one of the following directions: vertically downwards towards the ground or vertically upwards towards the sky, as viewed when the nacelle is mounted on top of the wind turbine tower. A preferred embodiment of the nacelle is the orifice being orientated vertically downwards. Thereby, hoisting of the hub with the main bearing will automatically result in the main bearing, if properly positioned axially in relation to the nacelle, passing the orifice and entering the slot during the hoisting of the hub with the main bearing, from the ground to the nacelle.

According to a third aspect possible of implementing based on the aspects of the invention, a method is provided for transporting elements of a wind turbine, said elements comprising a nacelle, a hub and a main bearing for the hub, assembling with fastening members the hub and the main bearing, assembling the nacelle including a plurality of nacelle components, positioning onto one carrier the hub with the main bearing mounted to the hub, positioning the nacelle and the nacelle components onto another carrier.

The third aspect of the invention is particularly, but not exclusively, advantageous for facilitating transportation of bulky or heavy wind turbine elements, and where transportation at the same time is eased and preferably more cost-effective.

Assembling the hub with the main bearing and assembling the nacelle and the plurality of nacelle components may take place at a site of production or at another preliminary site of transportation, said preliminary site of transportation being preliminary in relation to the site of installation of the wind turbine.

Assembling, with fastening means, the hub and the main bearing may take place by any suitable fastening members, preferably bolts and possible also nuts.

According to one step of the method of the invention, the one carrier is a platform or a trailer for one hauling truck, and where the other carrier is a platform of or a trailer for another hauling truck than the one hauling truck.

If the hauling truck or the trailer of the hauling truck has a limited hauling power, it may be necessary to transport the nacelle by one truck and the hub with the main bearing by another truck. However, due to the main bearing being mounted to the hub, the payload of the truck transporting the nacelle may still be sufficient even for a smaller truck having a reduced payload compared to a larger truck.

According to another step of the method of the invention, the one carrier is a platform or a trailer for one hauling truck, and where the other carrier is a platform of or a trailer for the same hauling truck as the one hauling truck.

If the platform of a hauling truck or the trailer of the hauling truck has a limited payload, or if roads used during transportation have a limited load capacity, it may be necessary to transport the nacelle on one trailer and the hub with the main bearing on another trailer. However, due to the main bearing being mounted to the hub, the payload of the one trailer transporting the nacelle may be sufficient for transporting the nacelle, even for a smaller trailer having a reduced payload, because the nacelle is relieved from the load of the main bearing.

When the hub, the main bearing and the nacelle are to be transported either from a site of production to a site of installation of the wind turbine, or from an initial point of transportation, e.g. from a harbour, to a subsequent point of transportation, e.g. the site of installation of the wind turbine, the hub and the main bearing will be transported together and the nacelle, preferably including all or most of the different elements of the nacelle, will be transported together. Thus, the main bearing will not be transported together with the nacelle.

Transportation of the hub with main bearing and of the nacelle may take place by sea, by air or by land. Especially in the case of transportation by land, the maximum payload of the truck, and/or the maximum hauling power of the truck, and/or the maximum axle load allowable on roads to pass during transportation may be limited. The present invention facilitates using platforms or trailers of different trucks, one truck for the hub with main bearing and one truck for the nacelle, or facilitates using different trailers of one truck, one trailer for the hub with main bearing and one trailer for the nacelle. The invention also facilitates using trucks with less hauling power, possibly having a smaller axle load.

Wind turbine elements for which the present invention is especially advantageous are wind turbines, where the weight of the hub and the main bearing is at least 15,000 kg, possibly between 30,000 kg and 100,000 kg.

Wind turbine elements for which the present invention is particularly, but not exclusively, advantageous are wind turbines, where the largest diameter of the main bearing is at least 1.0 m, possibly between 1.0 m and 5.0 m.

Wind turbines where the weight of hub with the main bearing, and/or the weight of the nacelle, and/or the dimension of the main bearing is as mentioned above, are wind turbines being manufactured today. Also, in the future, wind turbines will become larger and the elements of the wind turbine will be heavier and/or larger. Therefore, the problems solved by the present invention, said problem already solving problems of today's wind turbines, will be even greater in the future.

According to a preferred third aspect of the invention, the main bearing is mounted to the hub by a number of fastening members being forced through holes in a mounting flange of the hub, and said fastening members further being forced into recesses in a bearing ring of the main bearing. The bearing which the fastening members are forced into may be either the inner bearing ring or the outer bearing ring.

Fastening the hub to the inner bearing ring or the outer bearing ring of the main bearing is particularly, but not exclusively, advantageous when the hub with the main bearing subsequently is to be mounted to a main shaft of the wind turbine or is to be mounted directly to another element of the nacelle, said other element preferably being at least one of the following elements, with the proviso that the element is present in the nacelle: an input shaft of a gear box, a chassis of the gear box, a gear wheel of the gear box, a gear wheel suspension of the gear box, a main frame of the nacelle or a mounting flange of a main shaft. By using the inner bearing ring for mounting the main bearing to the hub, the outer bearing ring is free and readily accessible when having to mount the main bearing to a mounting flange of the main shaft or to the element in question of the nacelle. Similarly, by using the outer bearing ring for mounting the main bearing to the hub, the inner bearing ring is free and readily accessible when having to mount the main bearing to a mounting flange of the main shaft or to the element in question of the nacelle According to a fourth aspect of the invention, a method is provided comprising
positioning on top of a wind turbine tower, at the site of installation, the nacelle,
hoisting to the nacelle the hub with the main bearing being mounted to the hub,
where the main bearing is mounted to the hub by a plurality of fastening members forced through holes in the mounting flange of the hub and further being forced into recesses in a bearing ring of the main bearing, and
at the site of installation, said fastening members even further being forced into recesses in at least one element of the nacelle, said at least one element of the nacelle, with the proviso that the element is present in the nacelle, being: an input shaft of a gear box, a chassis of the gear box, a gear wheel of the gear box, a gear wheel suspension of the gear box, a main frame of the nacelle or a mounting flange of a main shaft.

Hoisting the hub with the main bearing and having the fastening members ready for being forced further into recesses such as threaded or non-threaded holes in the element in question of the nacelle, results in a fast and easy mounting of the hub and main bearing to the element in question already in position in the nacelle.

The first and fourth aspect of the invention together with the second and third aspect of methods possible of implementing based on the aspects of the invention, may each be combined with any of the other aspects presented. These four aspects and other aspects of the invention will be apparent from and elucidated with reference to the embodiments described hereinafter.

BRIEF DESCRIPTION OF THE FIGURES

The methods and the nacelle according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

When the hub, the main bearing and the nacelle is to be transported either from a site of production to a site of installing of the wind turbine, or from an initial point of transportation, e.g. from a harbour, to a subsequent point of transportation, e.g. the site of installing of the wind turbine, the hub and the main bearing will be transported together and the nacelle, preferably including all or some of the different elements of the nacelle, will be transported together. Thus, the main bearing will not be transported together with the nacelle.

Transportation of the hub with main bearing and of the nacelle may take place by sea, by air or by land. Especially in the case of transportation by land, the maximum payload of the truck, and/or the maximum hauling power of the truck, and/or the maximum axle load allowable on roads to pass during transportation may be limited. The present invention facilitates using platforms or trailers of different trucks, one truck for the hub with main bearing and one truck for the nacelle, or facilitates using different trailers of one truck, one trailer for the hub with main bearing and one trailer for the nacelle. The invention also facilitates using trucks with less hauling power, possibly having a smaller axle load.

Figure 1:
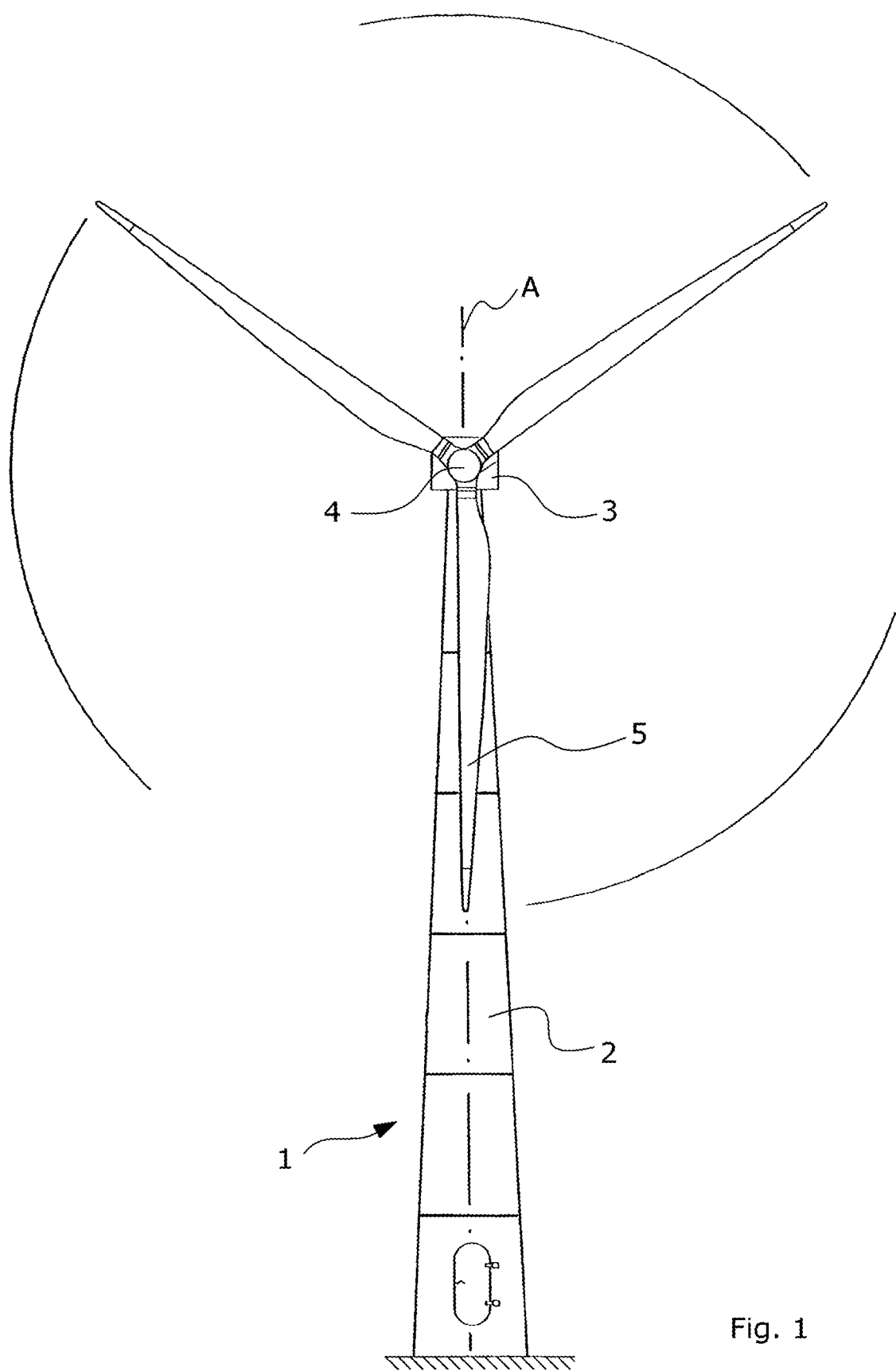
FIG. 1 shows a horizontal axis wind turbine according to the invention.

FIG. 1 shows a horizontal axis wind turbine 1. The wind turbine 1 comprises a foundation, a wind turbine tower 2, a nacelle 3, a hub 4 and rotor blades 5 which, together with the hub 4, constitute elements of a rotor.

Figure 2:
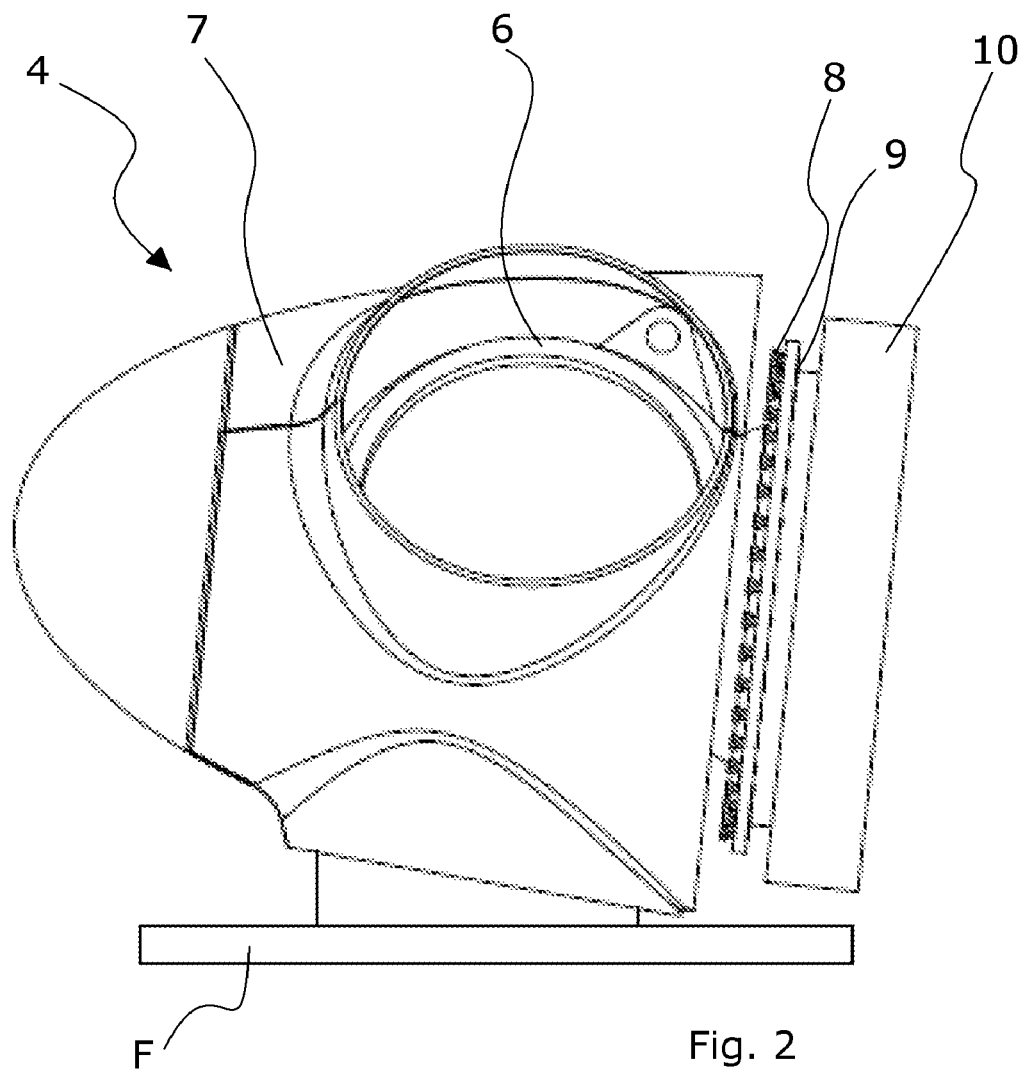
FIG. 2 shows a joint transportation of a hub and a main bearing.

FIG. 2 shows the hub 4 for a horizontal axis wind turbine, placed on a transportation footing F. The footing F is not a part of the wind turbine 1 itself, but is only used during transportation of the hub 4 together with a main bearing 10. The hub 4 comprises an inner main section 6, e.g. made from cast iron, and an outer shell section 7, e.g. made from fibre reinforced plastic.

A main bearing 10 for the hub 4 is mounted to the main section 5. The main bearing 10 is intended for suspending the hub 4 from an input shaft (see FIGS. 3A and 3B) of a gear box (see FIGS. 3A and 3B) of the wind turbine. In alternative embodiments, the main bearing 10 is intended for suspending the hub 4 from a mounting flange of a main shaft of the wind turbine. The input shaft of the gear box and alternatively the mounting flange of a main shaft are examples of elements of a nacelle whereto the main bearing may be mounted. Other possible elements of the nacelle whereto the main bearing may be mounted, with the proviso that the element is present in the nacelle, are: a chassis of the gear box, a gear wheel of the gear box, a gear wheel suspension of the gear box or a main frame of the nacelle.

The main bearing 10 is mounted to the main section 5 of the hub by a first set of bolts 8 extending through holes in a mounting flange 9 of the hub 4. The first set of bolts 8 extend through recesses (see FIG. 5) of the main bearing 10. In the embodiment shown (see FIG. 5), the recesses are holes, preferably threaded holes. In the remainder of the description, the recesses will be described as threaded holes intended for bolts. However, threaded holes intended for bolts must is not limiting possible other recesses such as non-threaded holes, and possible other elements such as pins, for securing the main bearing to the element in question of the nacelle.

The weight of the hub 4 is between 10,000 kg. and 75,000 kg., possible as much as 100,000 kg. The weight of the main bearing 10 is between 10,000 kg. and 25,000 kg, possibly as much as 50,000 kg. The main bearing 10 consists of an inner bearing ring 11, an outer bearing ring 12, and rollers 13 (see FIGS. 3A and 3B) situated between the inner bearing ring 11 and the outer bearing ring 12. In the embodiment shown, the threaded holes (see FIG. 5) for the bolts 8 used for mounting the hub 4 to the main bearing 10 are provided in the inner bearing ring 11. In an alternative embodiment, the threaded holes for the bolts 8 used for mounting the hub 4 to the main bearing 10 may be provided in the outer bearing ring 12.

Figure 3A:
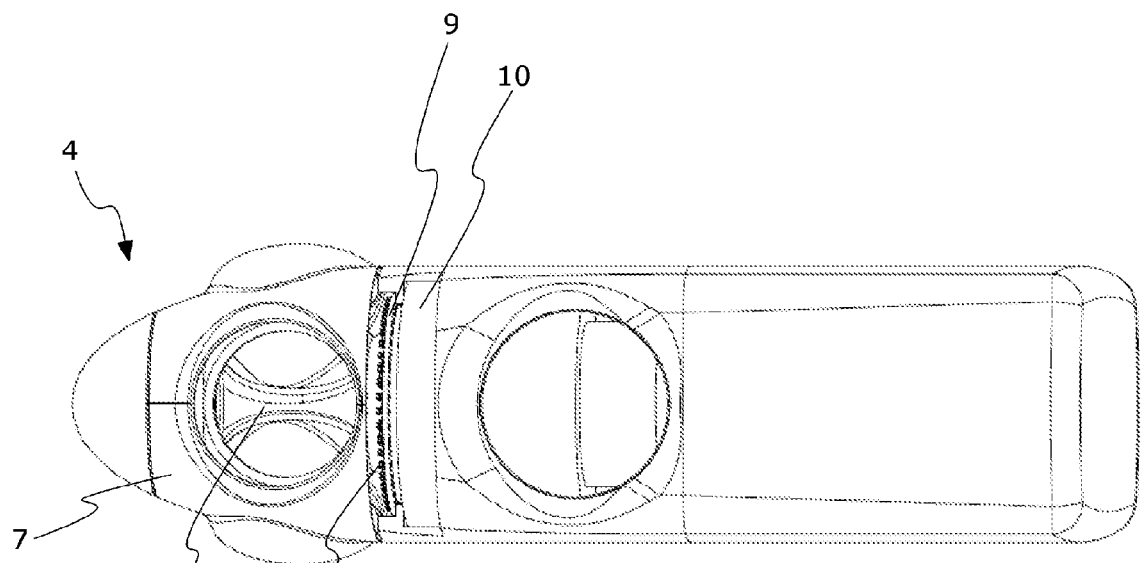
FIGS. 3A and 3B show a nacelle, a hub and a main bearing mutually mounted.
Figure 3B:
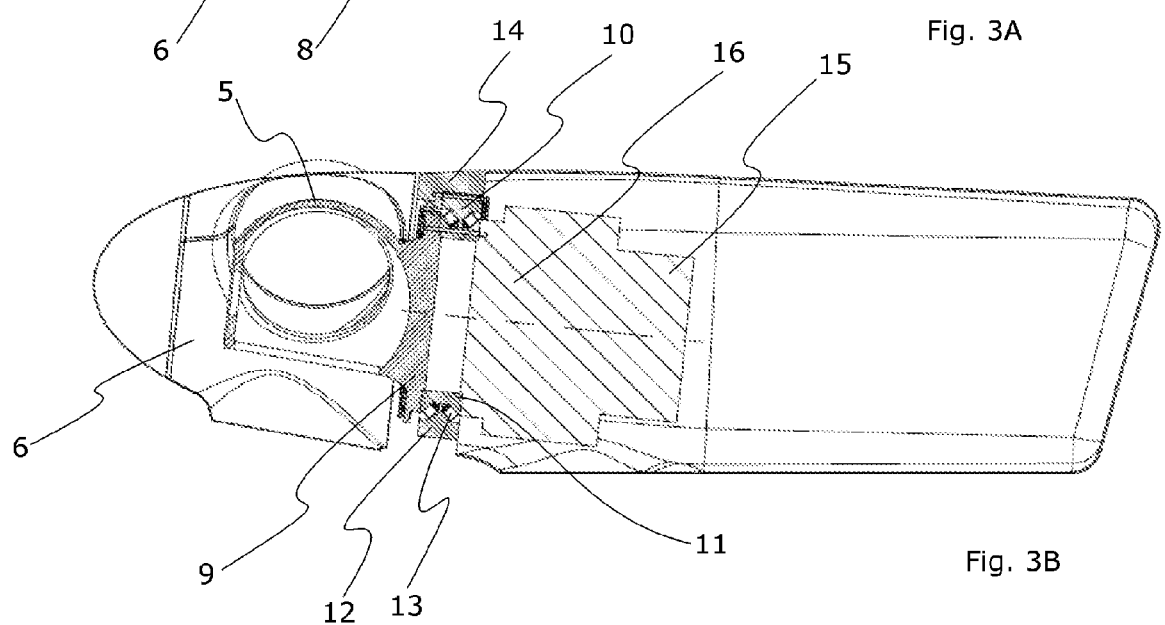

FIGS. 3A and 3B show a nacelle 2 for a horizontal axis wind turbine with a hub suspended from the nacelle via the main bearing 10 (the main bearing shown in a cross-sectional view). The nacelle 2 comprises, among many other elements, a gear box 15. The gear box 15 is situated in the front of the nacelle 2. The gearbox 15 is suspending the hub 4 in relation to a main frame 14 of the nacelle. The main frame 14 of the nacelle constitutes the frame structure of the nacelle 2. In the figures, the nacelle 2 is not provided with a main shaft. The hub 4 is suspended directly from an input shaft 16 of the gear box 15.

In an alternative embodiment, the hub 4 may be suspended from a mounting flange of a main shaft constituting an intermediate element between the hub 4 and the gear box 15. If a main shaft is provided, the main shaft will constitute an integrate part of the nacelle 2, and will not constitute a part of the hub 4.

The weight of the nacelle 2, including the different elements of the nacelle, e.g. the gear box 15, a generator (not shown) and possible a main shaft, but excluding the hub 4 and the main bearing 10, is between 50,000 kg. and 250,000 kg., possible as much as 500,000 kg.

Figures 4A, 4B:
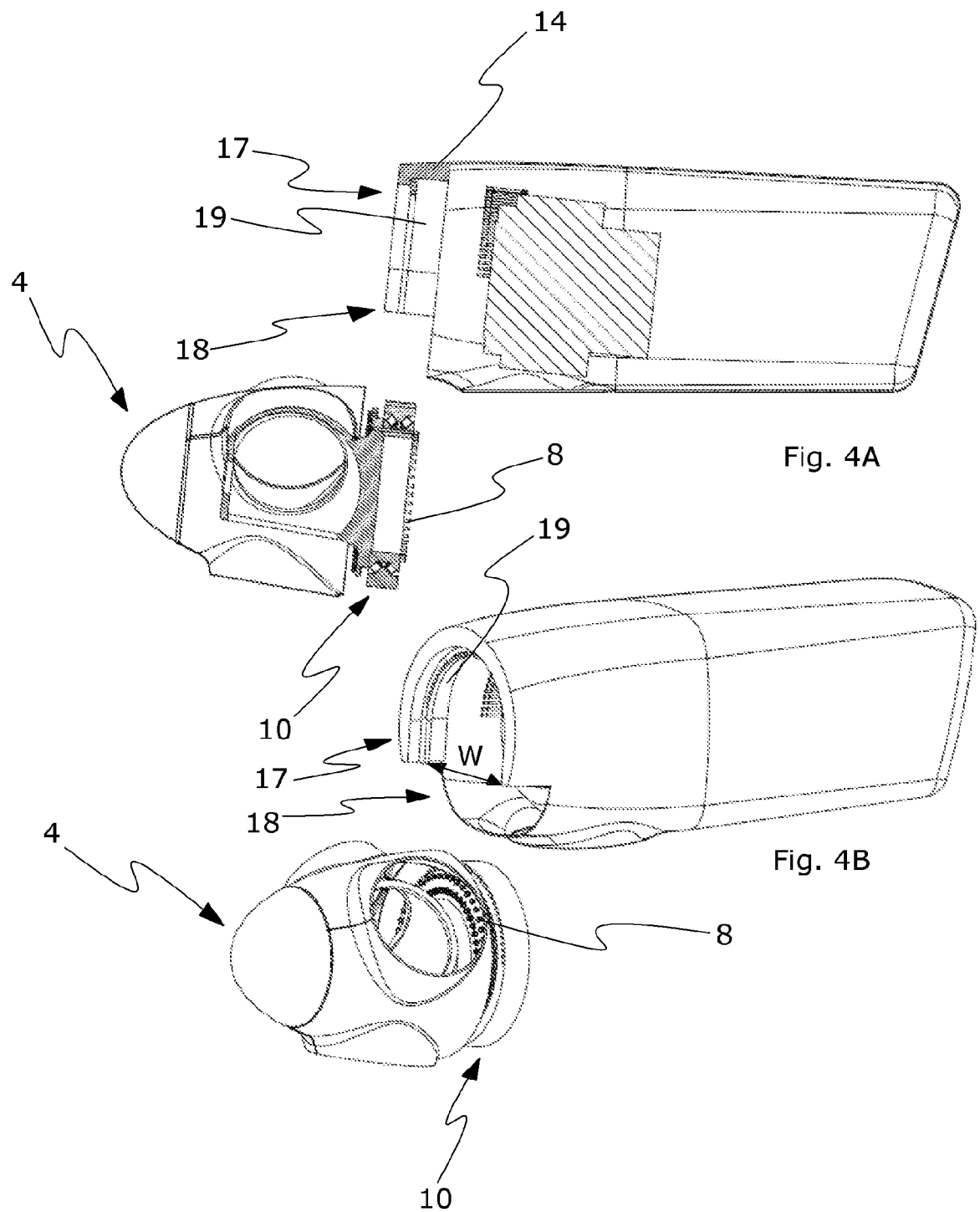
FIGS. 4A and 4B show a hub and a main bearing being mounted to a nacelle.

FIG. 4A and FIG. 4B show the hub 4 with the main bearing 10 and the nacelle 2 in a situation where the nacelle 2 is placed on top a wind turbine tower (not shown).

The hub 4 with the main bearing 10 (the main bearing shown in a cross-sectional view) is hoisted towards the nacelle 2 from the ground beneath the nacelle 2 and upwards. As shown, the hub 4 with the main bearing 10 may be hoisted without the rotor blades being mounted to the hub. Alternatively, the hub 4 with the main bearing 10 may be hoisted with the one, two or all three of the rotor blades being mounted to the hub. Whether one or more of the rotor blades are mounted to the hub 4 during hoisting of the hub 4 with the main bearing 10 depends on the size and/or the type of wind turbine, and depends on the choice of equipment, such as the choice of crane, during installation of the wind turbine.

The nacelle 2 is provided with a slot 17 at the front of the nacelle 2. The slot 17 is provided with an orifice 18 which, in the embodiment shown, extends vertically downwards toward the ground when the nacelle 2 is mounted on top of the wind turbine tower. The orifice is provided in a plane of the main bearing when the main bearing is in operating position in the nacelle. From the orifice 18, the slot 17 extends along sidewalls 19 of the slot 17 in a horseshoe-shaped configuration with the horseshoe-shape orientated upwards. In alternative configurations, the horseshoe-shape may be orientated downwards, i.e. with the orifice 18 extending upwards, or the horseshoe-shape may be orientated sideways, i.e. with the orifice 18 extending to the left or to the right.

A width W of the orifice 18 is larger than an outer diameter D of the outer bearing ring 12 of the main bearing 10. Thus, the main bearing 10 is capable of passing into the slot 17 through the orifice 18. In the figure, the gear box 15 is shown retracted from the front of the nacelle. A number of bolts 20 are shown, said bolts 20 intended for being fastened to the inner bearing ring 11 of the main bearing 10, when the main bearing 10 is in place in the slot 17 (see FIG. 5). Before fastening the second set of bolts 20 to the inner bearing ring 11 of the main bearing 10, the gear box 15 will be advanced to the front of the nacelle 2 (see FIGS. 3A and 3B).

Figure 5:
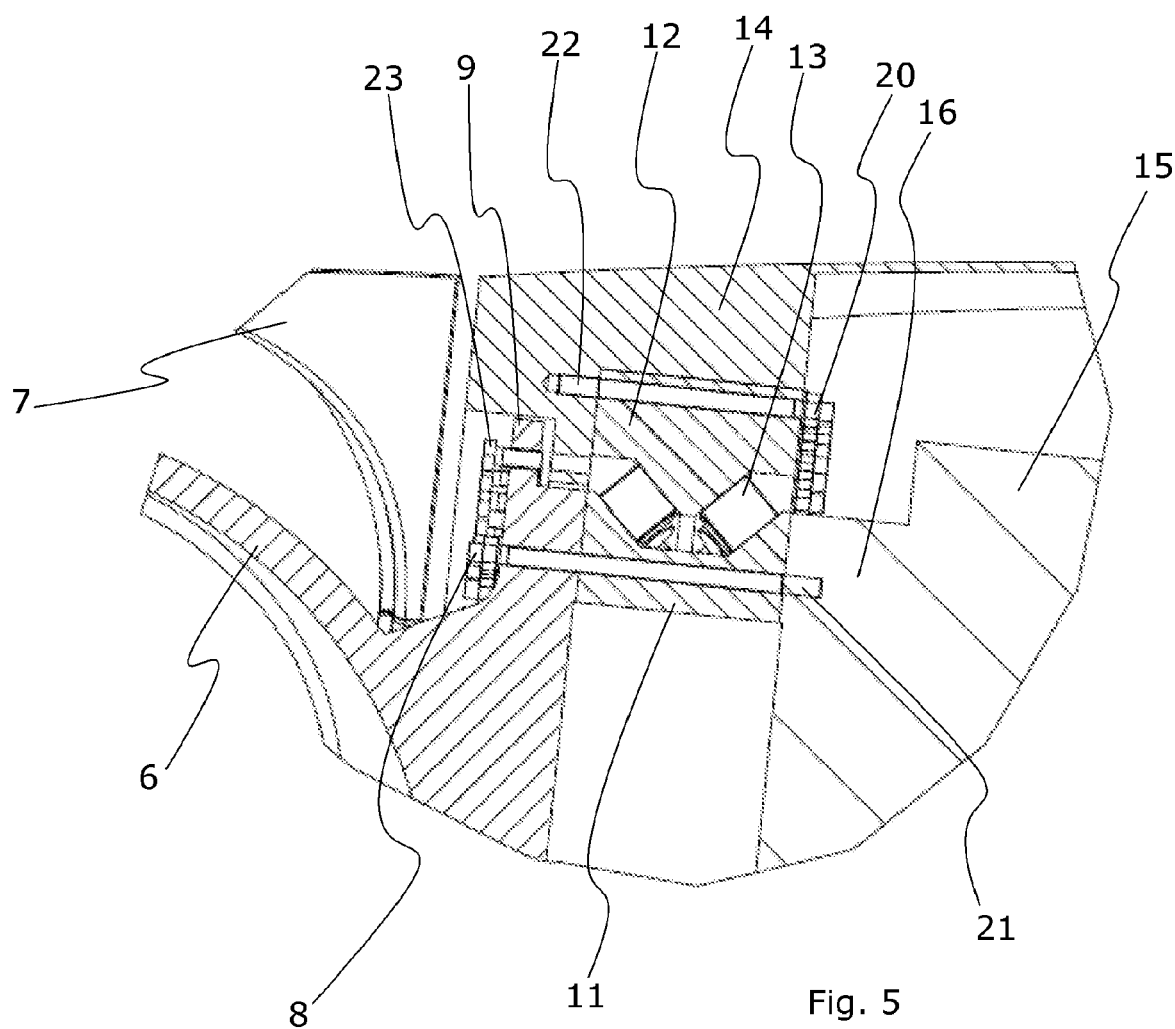
FIG. 5 shows the mutual mount between a nacelle, a hub and a main bearing.

FIG. 5 show the hub 4 with the main bearing 10 being mounted to the gear box 15 and to the main frame 14 of the nacelle, as also shown in FIGS. 3A and 3B. The hub 4 is mounted to the inner bearing ring 11 of the main bearing 10 via the first set of bolts 8 as during transportation of the hub 4 with the main bearing 10.

The input shaft 16 of the gear box 15 is also mounted to the inner bearing ring 11 via the same first set of bolts 8 as the bolts which mount the hub 4 to the inner bearing ring 11. Thus, a direct fastening is provided between the hub 4, the inner bearing ring 11 of the main bearing 10 and the input shaft 16 of the gear box 15.

The outer bearing ring 12 is fastened to the main frame 14 of the nacelle via the second set of bolts 20. The second set of bolts 20 extend through axial holes in the outer bearing ring 12 and into threaded holes in the main frame 14 of the nacelle. As mentioned, the main frame 14 of the nacelle is a rigid frame structure of the nacelle 2. The main frame 14 of the nacelle is not intended for rotation along the substantially horizontal rotational axis of the hub 4 and of the main bearing 10. Thus, a direct fastening is provided between the main frame 14 of the nacelle and the outer bearing ring 12 of the main bearing 10.

To summarize, the first set of bolts 8 extend from outside the nacelle 2, namely from the mounting flange 9 of the hub 4, through non-threaded holes in the mounting flange 9, further through non-threaded holes in the inner bearing ring 11 of the main bearing 10, and even further into threaded holes 21 of the input shaft 16 of the gear box 15. The second set of bolts 20 extend from inside the nacelle 2, through non-threaded holes in the outer bearing ring 12 of the main bearing 10 and further into threaded holes 22 of the main frame 14 of the nacelle.

Locking pins or bolts 23 are provided. During a possible non-operational situation of the wind turbine, the locking pins or bolts 23 is intended for extending from the mounting flange 9 of the hub 4, through other non-threaded holes in the mounting flange 9, and further into other holes 24 of the main frame 14 of the nacelle. The other holes 24 of the main frame of the nacelle 14 are non-threaded holes if the locking members are pins, and the other holes 24 the main frame of the nacelle are threaded holes if the locking members are bolts.

Figure 6A:
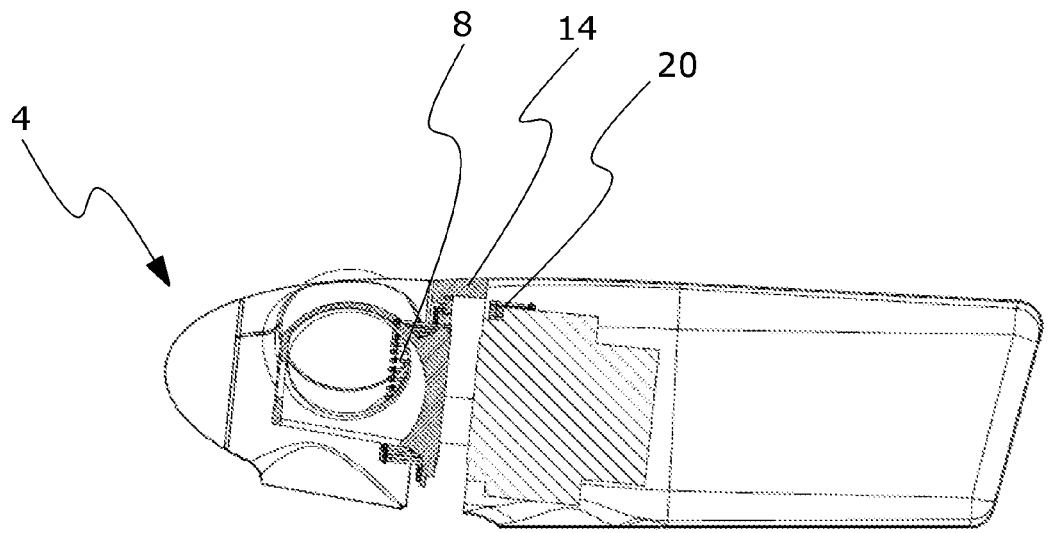
FIGS. 6A and 6B show a main bearing dismounted from a hub and a nacelle.
Figure 6B:
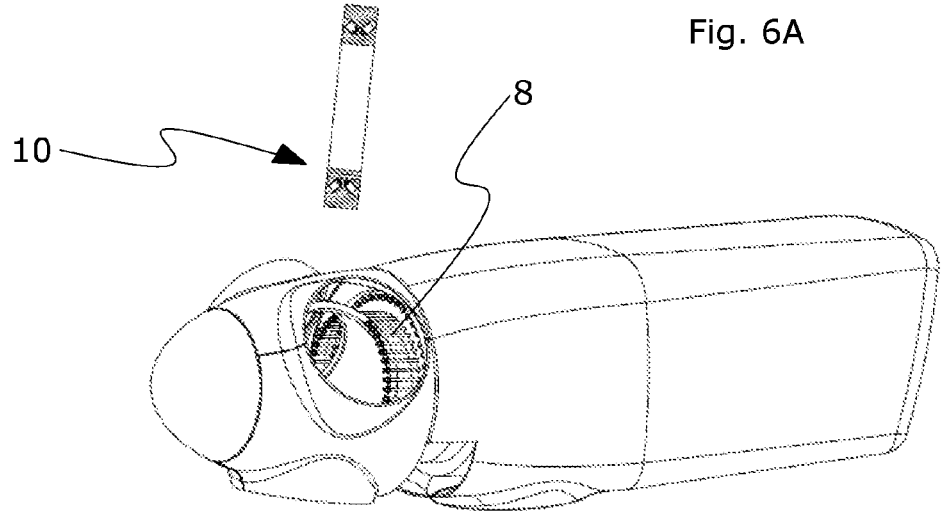
Figure 6B:
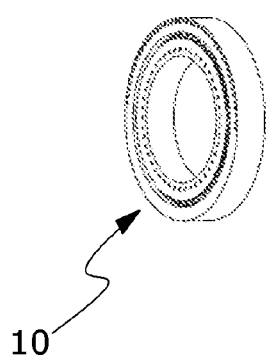

The locking pins of bolts 23 is intended for fastening the hub 4 to the main frame 14 of the nacelle, when the main bearing 10 is to be dismounted (see FIGS. 6A and 6B). In the figure, the locking pins or bolts 23 are in a retracted position, not fastening the hub 4 to the main frame 14 of the nacelle, i.e. in a position of the pins or bolts 23 where the wind turbine may be operational.

FIG. 6A and FIG. 6B show a situation where the main bearing 10 is dismounted from both the hub 4 and the nacelle 2 for possible maintenance, repair or replacement. Initially, the locking pins or bolts 23 is advanced from the retracted position (see FIG. 5) so that the pins or bolts 23 in the advanced position extend from the mounting flange 9 of the hub 4, through the non-threaded holes in the mounting flange 9, and further into the non-threaded or threaded holes 24 of the main frame 14 of the nacelle.

Subsequently, the first set of bolts 8 is released and is retracted from the holes 21 of the input shaft 16 of the gear box 15, retracted from the holes of the inner bearing ring 11 of the main bearing 10 and retracted from the holes of the mounting flange 9 of the hub 4. Finally, the second set of bolts 20 is released and is retracted from the holes 22 of the main frame 14 of the nacelle and retracted from the holes of the outer bearing ring 12 of the main bearing 10.

The main bearing 10 may then be lowered from the slot 17 through the orifice 18 by a crane being separate from the wind turbine, or a crane being integrate of the wind turbine, or the main bearing 10 may be lowered from the slot 17 through the orifice 18 by a service platform initially elevated from the ground to the nacelle and after dismounting of the main bearing 10 subsequently being lowered to the ground. Alternatively, the main bearing 10 may be maintained or repaired on a service platform elevated from the ground, without the need for the main bearing 10 to be lowered to the ground for maintenance or repair.

Whether the first set of bolts 8 is released before the second set of bolts 20 is released, or vice versa, does not matter, as long as the hub 4 initially is fastened to the main frame 14 of the nacelle by the locking pins or bolts 23. After the above method of applying the locking pins or bolts 23 and after releasing the first set of bolts 8 and the second set of bolts 20 has been performed, the main bearing 10 may be lowered from the slot 17 through the orifice 18.

When the main bearing 10 has been maintained or repaired and is to be remounted, or when a new main bearing 10 is to be mounted, a reverse method of the above described method is performed. The maintained or repaired main bearing 10, or the new main bearing 10, is hoisted to the nacelle 2 and is hoisted into the slot 17 through the orifice 18 of the slot 17.

Thus, initially the first set of bolts 8 is mounted and is advanced through the holes of the mounting flange 9 of the hub 4, through the holes of the inner bearing ring 11 of the main bearing 10 and through the holes 21 of the input shaft 16 of the gear box 15. Subsequently, the second set of bolts 20 is mounted and is advanced through the holes of the outer bearing ring 12 of the main bearing 10 and through the holes 22 of the main frame 14 of the nacelle.

Finally, the locking pins or bolts 23 is retraced from the advanced position so that the pins or bolts 23 no longer extend through the non-threaded or threaded holes 24 of the main frame 14 of the nacelle. The pins or bolts 23 may still be present in the holes of the mounting flange 9 of the hub 4, for possible later use.

Whether the first set of bolts 8 are advanced before the second set of bolts 20 are advanced, or vice versa, does not matter, as long as the hub 4 finally is released from the main frame 14 of the nacelle by the locking pins or bolts 23. The method of applying the first set of bolts 8 and the second set of bolts 20 and releasing the locking pins or bolts 23 results in the main bearing 10 being mounted to the hub 4, to the input shaft 16 of the gear box 15 and to the main frame 14 of the nacelle.

The main bearing 10 may be hoisted to the slot 17 by a crane being separate from the wind turbine, or by a crane being integrate of the wind turbine, or the main bearing 10 may be hoisted to the slot by a service platform initially lowered to the ground and subsequently elevated from the ground to the nacelle 2. Alternatively, the main bearing, after having been maintained or repaired on a service platform elevated from the ground, may be remounted from the service platform.

As mentioned, in the embodiment shown the orifice 18 is orientated downwards, preferably vertically downwards. Alternatively, hoisting of the main bearing 10 may involve hoisting the main bearing 10 to a position above the nacelle 2 and lowering the main bearing 10 into a slot 17 having the orifice 18 orientated upwards towards the sky. Even in the alternative, hoisting of the main bearing 10 may involve hoisting the main bearing 10 to a position beside the nacelle and displacing the main bearing 10 sideways into a slot 17 having the orifice 18 orientated sideways. Even further in the alternative, the orifice or rather more orifices may be orientated both downwards and upwards, respectively, or may be orientated sideways to both sides, i.e. both sideways to the left and sideways to the right, respectively.

Figures 7A, 7B:
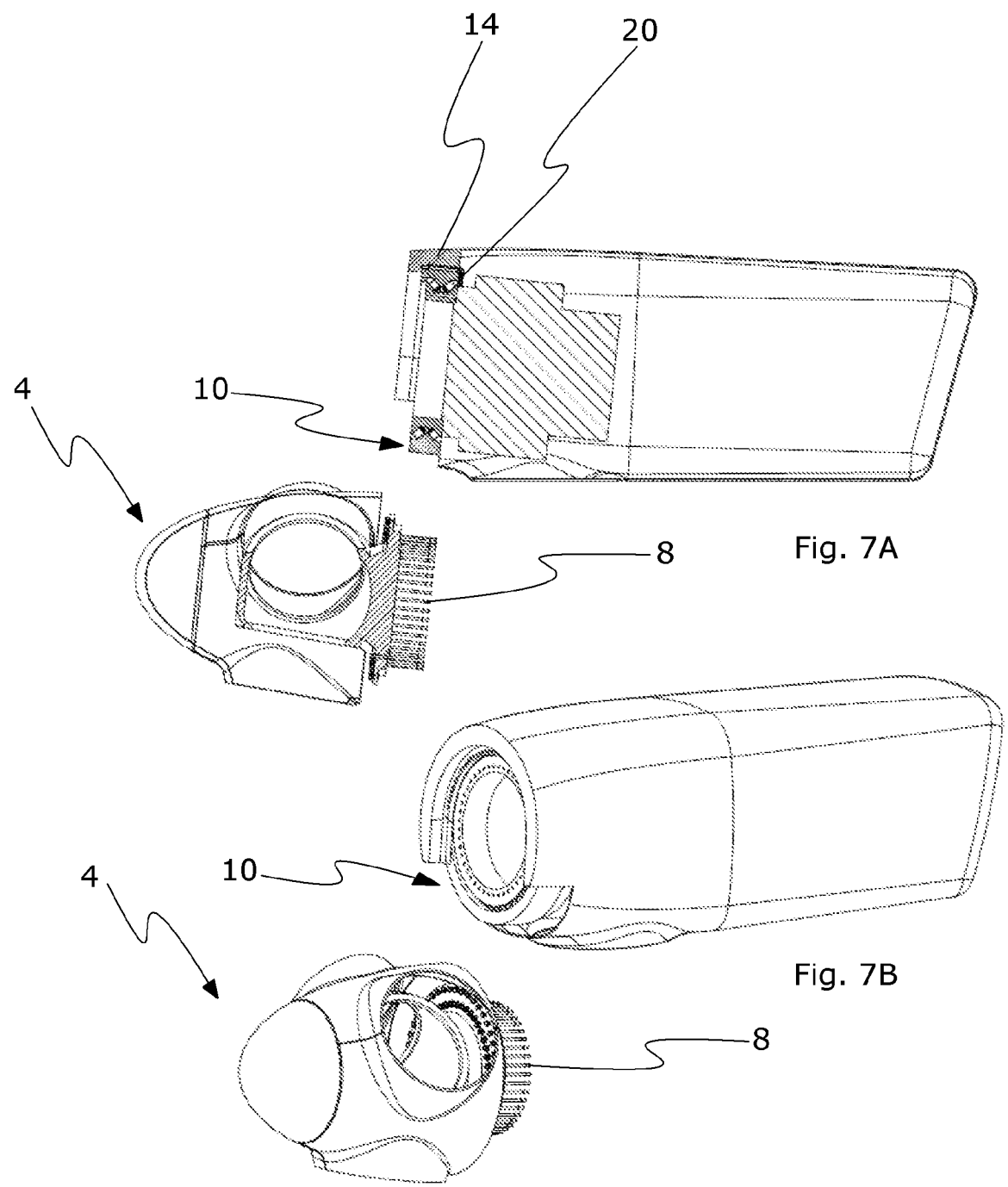
FIGS. 7A and 7B show a hub dismounted from a main bearing and a nacelle.

FIG. 7A and FIG. 7B show a situation where the hub 4 is dismounted from the main bearing 10 for possible maintenance, repair or replacement. The locking pins or bolts 23 are not in use in the situation where the hub 4 is dismounted.

Firstly, the first set of bolts 8 is partly released and is only retracted from the holes 21 of the input shaft 16 of the gear box 15. The first set of bolts 8 are also retracted from the holes of the inner bearing ring 11 of the main bearing 10, but the bolts 8 are not retracted from the holes of the mounting flange 9 of the hub 4.

The second set of bolts 20 is maintained in position extending through the holes 22 of the main frame 14 of the nacelle and through the holes of the outer bearing ring 12 of the main bearing 10.

The hub 4 may then be lowered from the main bearing 10 by a crane being separate from the wind turbine, or a crane being integrate of the wind turbine, or the hub 4 may be lowered by a service platform initially elevated from the ground to the nacelle and after dismounting of the hub 4 subsequently being lowered to the ground. Alternatively, the hub 4 may be maintained or repaired on a service platform elevated from the ground, without the need for the hub 4 to be lowered to the ground for maintenance or repair.

When the hub 4 has been maintained or repaired and is to be remounted, or when a new hub 4 is to be mounted, a reverse method of the above described method is performed. The maintained or repaired hub 4, or the new hub 4, is hoisted to the nacelle 2 with the mounting flange 9 of the hub being positioned in axial alignment with the main bearing 10. Thereafter, the first set of bolts 8 is fully advanced through the holes 21 of the input shaft 16 of the gear box 15.

The hub 4 may be hoisted to the nacelle 2 by a crane being separate from the wind turbine, or by a crane being integrate of the wind turbine, or the hub 4 may be hoisted to the nacelle 2 a service platform initially lowered to the ground and subsequently elevated from the ground to the nacelle 2.

As mentioned, in the embodiment shown the orifice 18 of the slot 17 is orientated downwards, preferably vertically downwards. Alternatively, hoisting of the hub 4 may involve hoisting the hub 4 to a position above the nacelle 2 and into a slot 17 having the orifice 18 orientated upwards. Even in the alternative, hoisting of the hub 4 may involve hoisting the hub 4 to a position beside the nacelle 2 and into a slot 17 having the orifice 18 orientated sideways.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A nacelle for a wind turbine having a hub and a main bearing, comprising:
    a main frame of the nacelle;
    a housing disposed generally about the main frame and defining an interior and an exterior of the nacelle; and
    a slot in the main frame at one end of the nacelle for accommodating the main bearing for the hub,
    wherein said slot is configured as a horseshoe-shaped cavity in the main frame of the nacelle with an orifice and an inner extension, said orifice having a width when viewed in a plane perpendicular to a substantially horizontal axis, said width of the orifice being larger than a transverse dimension of the main bearing when the main bearing is in position and viewed in the plane perpendicular to the substantially horizontal axis, and wherein the horseshoe-shaped cavity is arranged such that the main bearing is positionable in the cavity from the exterior of the nacelle without passing through the interior of the nacelle.

2. The nacelle according to claim 1, wherein said orifice has an orientation, when viewed perpendicular to the width and when viewed in the plane perpendicular to a substantially horizontal axis, directed in at least one of the following directions: downwards towards the ground, upwards towards the sky, as viewed when the nacelle is mounted on top of the wind turbine tower, or sideways.

3. A wind turbine, comprising:
    a nacelle having a main frame of the nacelle;
    a hub; and
    rotor blades,
    wherein said nacelle includes a housing disposed generally about the main frame and defining an interior and an exterior of the nacelle and a slot in the main frame of the nacelle to accommodate a main bearing for the hub, said slot configured as a horseshoe-shaped cavity with an orifice in the main frame of the nacelle, and said orifice having a width, when viewed in a plane perpendicular to a substantially horizontal axis, larger than a transverse dimension of the main bearing when viewed in the plane perpendicular to a substantially horizontal axis, and wherein the horseshoe-shaped cavity is arranged such that the main bearing is positionable in the cavity from the exterior of the nacelle without passing through the interior of the nacelle.

4. The wind turbine according to claim 3, wherein said orifice has an orientation, when viewed perpendicular to the width and when viewed in the plane perpendicular to a substantially horizontal axis, directed in at least one of the following directions: downwards towards the ground, upwards towards the sky, as viewed when the nacelle is mounted on top of the wind turbine tower, or sideways.

* * * * *